Feb. 6, 1962 A. R. MANCINI 3,019,644
ADHESION TESTING MACHINE
Filed March 10, 1958 2 Sheets-Sheet 1

INVENTOR.
ALFONSO R. MANCINI
BY
*Francis S. Blake*
ATTORNEY

Feb. 6, 1962  A. R. MANCINI  3,019,644
ADHESION TESTING MACHINE
Filed March 10, 1958  2 Sheets-Sheet 2

INVENTOR.
ALFONSO R. MANCINI
BY
Francis E. Blake
ATTORNEY

United States Patent Office 3,019,644
Patented Feb. 6, 1962

3,019,644
ADHESION TESTING MACHINE
Alfonso R. Mancini, Penfield, N.Y., assignor to General Dynamics Corporation, Rochester, N.Y., a corporation of Delaware
Filed Mar. 10, 1958, Ser. No. 720,155
5 Claims. (Cl. 73—150)

The present invention relates to testing machines and, more particularly, to a machine for testing the bond strength between two laminated layers of material at least one layer of which is relatively flexible.

In order to maintain certain standards of production it is often necessary to test and measure the bond strength between laminated layers of materials. For example, the widespread use of printed circuits in electronic equipment is based on the requirement that the printed circuit layer of copper or other relatively flexible electrically conductive material be uniformly and securely bonded to the supporting layer or sheet of relatively inflexible insulating material.

It is a principal object of the present invention to provide a testing machine for quickly and reliably testing the bond strength between two layers of laminated material at least one layer of which is relatively flexible, such as a layer of copper or the like, bonded to another layer comprised of a sheet or board of insulating matrial.

Another object of the invention is to provide a testing machine for testing the bond strength between two laminated layers of material at least one layer of which is relatively flexible and which will enable a continuous test of the bond strength as the layers are separated along the length of the bond.

Yet another object of the invention is to provide a continuously indicating bond tester as set forth in the foregoing objects and which is arranged in such manner as to maintain a high uniformity of testing conditions as the layers are continuously separated along the length of the bond therebetween.

A feature of the invention is the provision of means to move one layer of material to be tested in one direction together with means to move the other layer of material in a direction perpendicular to the direction of movement of the one layer and having common driving means for both of the layer moving means such that the perpendicular relationship for the movement of the two layers is accurately maintained as the layers are continuously moved to thereby separate the layers along the length of the bond therebetween. With such an arrangement, a continuous measurement of the force required to move one of the layers or a continuous measurement of the force required by the common driving means for the layer moving means will be a continuous and accurate indication of the bond strength between the laminated layers as they are separated.

Further objects, features, and the attending advantages of the invention will be apparent with reference to the following specification and drawings in which, FIG. 1 is a perspective elevational view of the bond testing apparatus of the invention;

Figure 1:
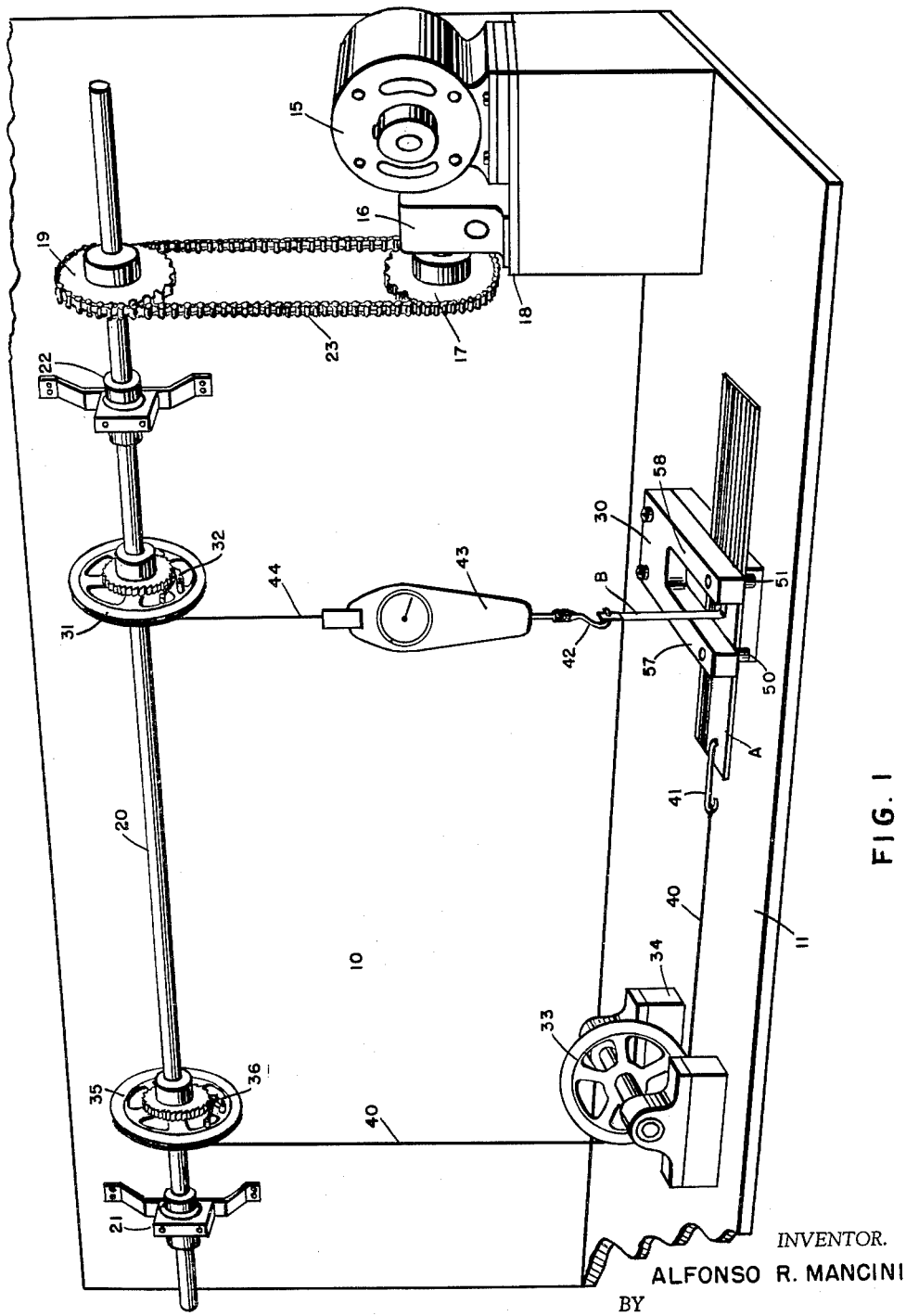
Figure 2:
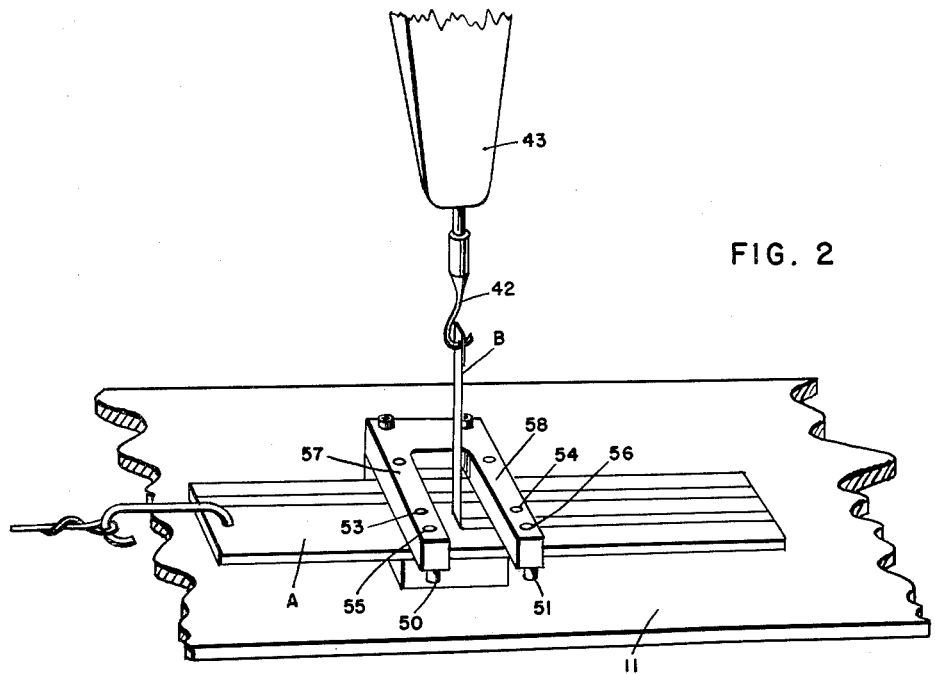
FIG. 2 is an enlarged perspective of the material support or guide.
Figure 3:
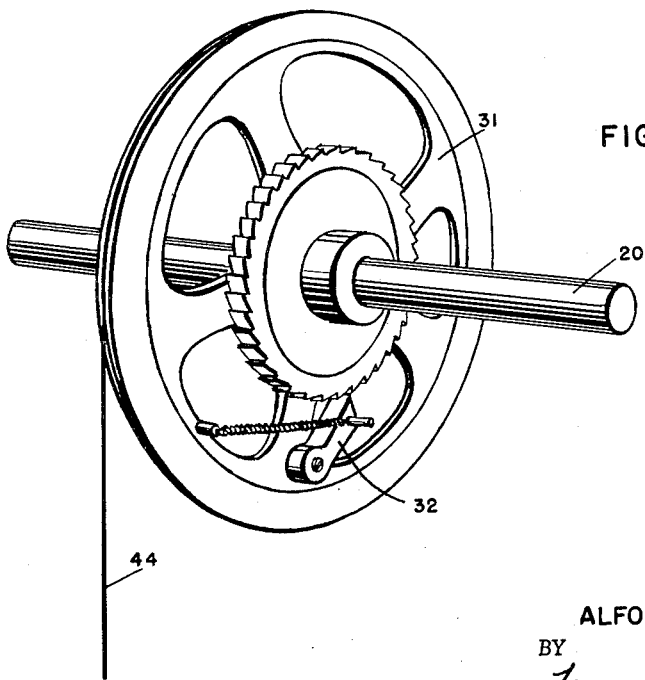
FIG. 3 is an enlarged perspective of one of the driving pulleys and its arrangement on the drive shaft.

Referring to the drawings, the testing apparatus of the invention may be mounted and supported in any suitable manner. For the purpose of clarity in FIG. 1 of the drawings, the illustration of the particular supporting framework has been simplified. However, a vertically extending end panel 10 together with a lower supporting shelf 11 extending at right angles to the end panel 10 may be arranged generally as shown in FIG. 1 of the drawings for supporting the various structural elements to be described. The electric motor 15, which is connected to the gear reduction unit 16 and the sprocket gear 17, is supported on a supporting panel 18 extending at rigth angles from the vertical rear panel 10. It should be understood that any suitable supporting arrangements may be provided in place of the simple arrangement of panels and shelves thus far described.

A common drive shaft 20 is journaled on suitable pillow block bearings 21 and 22 which are secured to the panel 10 near the upper end thereof. A sprocket chain 23 interconnects the sprocket gears 17 and 19 between the speed reducing drive 16 and the shaft 20 so that the drive shaft 20 may be very slowly rotated in a given direction such as a clockwise direction when the motor 15 and reducing drive 16 are operated.

A bifurcated support member 30 is secured to the lower supporting shelf 11 at a position immediately beneath the drive pulley 31 which is connected to the drive shaft 20 to be rotated therewith through the ratchet gear finger 32. An idler pulley 33 is journaled on a support bracket 34 which is also secured to the supporting shelf 11 generally beneath the position of a second drive pulley 35 that is connected to be driven by the common drive shaft 20 through the ratchet connection 36. The ratchet connections 32 and 36 may be identical to each other and are arranged such that when the drive shaft 20 is rotated in a given direction, such as, for example, the clockwise direction, the pulleys 31 and 35 must be simultaneously rotated also in the clockwise direction. Obviously, any simple form of clutch arrangement may be substituted for the simple ratchet connections 32 and 36 for connecting the drive pulleys 31 and 35 to the common drive shaft 20. It will be noted that the pulleys 31 and 35 are of the same diameter so that a flexible cord or the like connected to the periphery of each pulley will be moved equal amounts as the common drive shaft 20 is rotated.

More particularly, the flexible cord 40 is fastened to the periphery of the pulley 35 and passes around the periphery of the idler pulley 33 and is connected by means of any suitable fastener or connector 41 to an end of one layer A of laminated material to be tested. It should be pointed out that the sample of laminated material to be tested is positioned beneath the legs of the bifurcated support member 30 and the other layer B, which would be an upper flexible layer, is passed upward between the legs 57 and 58 of the bifurcated support member 30 to the clamp or hook 42 on the end of the spring scale 43. The other end of the spring scale 43 is fastened to the flexible cord 44 which passes over and is fastened to the periphery of the pulley 31.

By manipulating the ratchet connections 32 and 36, the drive pulleys 31 and 35 may be adjusted on the drive shaft 20 to tighten the flexible cords 40 and 44 and properly position the sample under the bifurcated guide with the flexible laminate layer B extending upward between the bifurcated legs of the guide 30 at an angle generally perpendicular to the direction of the lower layer A of laminated material that is connected by the clamp 41 to the flexible cord 40. Also, it will be noted that the relationship of the positions of the idler pulley 33 and support 30 above the shelf 11 are such that the sample of material is held up against the under side of the supporting guide member 30 and a perpendicular relationship for the layer B relative to the layer A is maintained while the cords 40 and 44 are placed under tension. Therefore, upon energizing the electric motor 15, the shaft 20 will be slowly rotated to advance both layers of the test sample in the respective directions at right angles to each other at an equal rate of speed so as to continuously maintain the perpendicular relationship during the separation of the two layers. While the separation of the two layers is taking place, the indication by the spring scale 43 of the force required to move the flexible layer upward between the bifurcated legs of the guide member 30 will be a continuous indication of bond strength between the layers as they are separated.

The bifurcated support guide 30 may be provided with pins 50 and 51 which may be variously positioned selectively in the holes 53, 54 or 55, 56 to accommodate different widths of sample material to be tested. Other holes similar to 53, 54 may be provided in the legs of the support 30 as desired to accommodate various widths of sample material to be tested. The pins, such as 50, 51, would function to prevent the sample from twisting or turning in its movement underneath the guide toward the pulley 33 when the machine is operated. Also, although bifurcated support arms 57 and 58 have been shown to be provided to facilitate the placement of the sample in the position to be tested, it should be obvious that any form of slotted support member could be used so long as an opening is provided of such shape and size as to enable the movement of the upper and more flexible one of the layers of the test sample upwards towards the pulley 31 in a direction generally perpendicular to the direction of movement of the lower layer of the sample.

Various modifications will occur to those skilled in the art within the spirit of the invention and the scope of the appended claims.

What is claimed is:

1. A machine for testing the bond strength between two layers of a laminated material at least one of which is a flexible material, a first means coupled to said flexible material to move said flexible material in a first given direction from a given fixed point, a second means coupled to the other layer to move said other layer in a second given direction from said given fixed point, said first given direction being perpendicular to said second given direction at said given fixed point, a third means coupled to said first and second means for moving both said first and second means at a given uniform rate of speed in said first and second given directions respectively, whereby said laminated material is stripped at said given fixed point uniformly, and said first means includes measuring means for gauging said bond strength, said measuring means being responsive to a tensile force between said first means and said flexible material.

2. The machine defined in claim 1 wherein said machine further includes a bifurcated guide member having first and second legs spaced apart, said first and second legs defining a plane, said plane being substantially perpendicular to said first given direction.

3. The machine defined in claim 2 wherein said flexible material is disposed between said first and second legs, and said given point being positioned substantially equidistant from and between said first and second legs.

4. The machine defined in claim 3, wherein said bifurcated guide member includes means for maintaining said other layer in said second given direction.

5. The machine defined in claim 1, wherein said measuring means for gauging said bond strength includes a spring scale.

References Cited in the file of this patent
UNITED STATES PATENTS

| 2,473,517 | Freedman | June 21, 1949 |
| 2,834,205 | Pickup | May 13, 1958 |

OTHER REFERENCES

ASTM Standards on Adhesives, Sept. 1954, pages 19–29; ASTM Designation D429–47T. (Copy in Patent Office Library.)